United States Patent [19]

Hoffman et al.

[11] 4,019,886

[45] Apr. 26, 1977

[54] METHOD OF MANUFACTURE OF MULTIPLE GLASS NOZZLE ARRAYS

[75] Inventors: Arthur Rowland Hoffman, Longmont, Colo.; Arthur Harry Kendall, Franklin Lakes, N.J.; Robert Lewis Rohr, Scarsdale, N.Y.

[73] Assignee: International Business Machines Corporation, Armonk, N.Y.

[22] Filed: Dec. 12, 1975

[21] Appl. No.: 640,138

[52] U.S. Cl. .................................. 65/43; 65/55; 65/56
[51] Int. Cl.² ........................................ C03B 23/20
[58] Field of Search ............. 65/43, 55, 56, 42, 44; 346/140, 140 A, 75

[56] References Cited

UNITED STATES PATENTS

| | | |
|---|---|---|
| 3,156,950 | 11/1964 | Walton, Jr. .................... 65/43 X |
| 3,754,882 | 8/1973 | Esdonk et al. .................... 65/56 |
| 3,773,484 | 11/1973 | Gray, Jr. et al. ................ 65/43 X |
| 3,883,335 | 5/1975 | Polaert .......................... 65/44 X |

Primary Examiner—Arthur D. Kellogg
Attorney, Agent, or Firm—Edward S. Drake

[57] ABSTRACT

Multiple nozzle arrays are formed from an assembly of at least one pair of plates having intersecting channels for receiving orifice elements and sealant. The joined plates, with inserted orifice elements in one channel and sealant in the other channel are then mounted vertically or at an appropriate angle and exposed to a temperature sufficient to cause the sealant alone to melt and to flow by capillary action to seal the orifice elements in a void-and-bubble free manner and to seal the plates to form a plate block. After cooling, the plate block is sliced into multiple nozzle wafers.

15 Claims, 15 Drawing Figures

METHOD OF MANUFACTURE OF MULTIPLE GLASS NOZZLE ARRAYS

BACKGROUND OF THE INVENTION

1. Field of Invention

The invention relates to multiple nozzle arrays, and particularly to a method for making multiple nozzle wafers for use in ink jet recording.

2. Description of the Prior Art

The fabrication of glass tubes with very small openings is known in the art. For example, U.S. Pat. No. 3,294,504 to John W. Hicks, Jr., which issued on Dec. 27, 1966, discloses the manufacture of glass fibers by assembling as many as ten thousand glass tubes 0.010 inch in diameter and one foot long into a bundle about one inch in diameter, which are fused into a composite assembly and sliced into wafers. U.S. Pat. No. 3,216,807 to Richard F. Woodcock, which issued on Nov. 9, 1965, discloses a process for fabricating fiber optical devices wherein the fiber optic elements are placed in a grooved block which serves as an alignment means.

Also known in the art is a method for making nozzles used in ink jet recording. For example, U.S. Pat. No. 3,662,399 to Takao Yanoi, which issued on May 9, 1972, discloses the fabrication of such a nozzle which comprises a glass capillary over which a silicone coating is deposited. The coated capillary is then sliced to obtain a nozzle of desired length.

Reference may also be made to a pending application entitled "Pre-Aimed Nozzle for Ink Jet Recorder and Method of Manufacture," Ser. No. 544087, filed Jan. 27, 1975, now abandoned to D. F. Jensen, et al. (EN9-74-021). There is disclosed the potting of a tube in a groove of a wafer block with soldered glass and the cutting of the block along planes perpendicular to the external location surfaces to obtain tubes precisely aimed relative to the wafer body.

Another pending application, "An Apparatus and a Method for Fabricating Precision Tubing and Ink Jet Nozzles," Ser. No. 573,233, filed Apr. 30, 1975, now abandoned to A. R. Hoffman et al. (Y09-73-076), discloses a method and an apparatus for the batch fabrication of ink jet nozzles in which high pressure ink nozzles are fabricated by carefully controlled drawing of glass tubing.

It is also known how to slot plates with precision and to convert plate assemblies into usuable nozzle wafers. For example, U.S. Pat. No. 3,674,004 to Johannes Grandia et al., which issued on July 4, 1972, describes a precision cutting apparatus. The IBM Technical Disclosure Bulletin, Vol. 17, No. 7, Dec. 1974, p. 2171, discloses a precision lapping and polishing apparatus.

In ink jet recorders, liquid ink is supplied under pressure to a nozzle having a very small opening through which extremely fine, continuous jet of ink is projected. It has become recognized that the proper operation of such recorders very much depends upon the manner in which the nozzle is sealed to its surrounding surface. The area in the vicinity of the nozzle must be void-free and bubble-free to prevent leaking or breaking when the nozzle, in thin wafer form, is subjected to fluid pressure. Furthermore, the sealing operation must be performed in such a way as not to alter the nozzle in size or shape. Also, the sealing operation must be performed in such a way as not to alter the previously sealed surfaces. Thermal expansion curves of the fabricating elements must be carefully considered to prevent excessive stresses and/or cracking of any of the elements, especially when they are cut into thin wafers, then lapped and polished for use in ink jet recorders. None of the methods described in the above prior art provide a nozzle seal of this high quality.

The use of multiple glass nozzles sealed in accordance with this invention meets all the requirements of nozzle-per-spot technology in ink jet recording. By providing parallel sealed glass nozzles of uniform size and area, velocity uniformity, break-off uniformity, directional uniformity and directional stability are achieved. Drilling holes in a block of ceramic or other material cannot provide such identical holes to meet all these requirements. Furthermore, it has been found that glass provides better nozzle size and area uniformity than silicon. Glass nozzles provide less wandering of fluid streams, that is, about 0.5–1.0 milliradians compared to some 3–8 milliradians for other kinds of nozzles. Locating such glass tubes side-by-side improves hole alignment uniformity, that is, about 0.1 mil in 2 inches compared to 3 mils in 2 inches for other kinds of nozzles.

SUMMARY OF THE INVENTION

It is a general object of this invention to provide a multiple nozzle array with superior performance characteristics.

It is another object of this invention to provide an improved multiple nozzle wafer for ink jet recorders.

It is another object of this invention to provide an improved method for fabricating multple nozzle arrays.

It is still another object of this invention to provide an improved method for fabricating multiple nozzle wafers for use in ink jet recorders, in which a void-free and bubble-free joint is developed between the nozzle and the surrounding surface.

In the preferred embodiment, ceramic or glass blocks are machined to form two plates of a desired smoothness and dimension, preferably in rectangular form. A single groove is formed the length of one side of the first plate, and cross-slots, deeper than the groove, are formed the width of the same side and intersecting the groove. Slots corresponding to the cross-slots in the first plate are formed the width of one side of the second plate. The groove holds a plurality of glass tubes which may be positioned before or after the two plates are joined. Each slot holds a sealant, such as glass cane, which is entered after the two plates are joined.

The joined plates with tubes and glass cane are then spring clamped in an upright position on a support, and this entire assembly is then exposed to a temperature which is sufficient to melt only the glass cane, which will then flow by capillary and gravity action, through the groove to provide a complete seal for the tubes, specifically in the area between the cross-slots. After the sealing operation has been completed, the joined plates are gradually cooled and then the area between the slots is sliced into thin nozzle wafers. The presence of the cross slots guarantees uniform fill of the wafer section, reduces the longitudinal distance of seal glass flow and the area of the section cut, and serves as a vent to prevent air entrapment and thus voids, and as a means of introducing coolant as close as possible to the cutting device and wafer nozzles. After one side of the cut wafer undergoes lapping and polishing operations, it is ready for mounting on a back-up plate using techniques such as epoxy bonding, glass sealing or soldering. After mounting, the front side of the wafer is lapped and polished. The wafer thus mounted on the back-up plate is ready for connection to a source of high-pressure fluid.

In the second embodiment, a ceramic block is machined to form a wafer plate of a desired smoothness and dimension, preferably in rectangular form. Parallel grooves are formed the length of one side of the wafer plate, and cross-slots, slightly larger than the grooves, are machined preferably perpendicular to the grooves and intersecting the grooves. A flat cover plate, which preferably is of the same dimension and material as the wafer plate, is placed along the entire surface of the wafer plate to cover all but the ends of the tubes. Each groove in the wafer plate holds a glass tube, which is generally entered before the cover plate is applied. The joined plates are then placed in an upside down position on an inclined plane support, and a sealant, such as glass cane, is placed in each slot.

The entire assembly is then exposed to a temperature which is sufficient to melt only the glass cane, which will then flow, by capillary and gravity action, through all the grooves to provide a complete seal of the tubes. After the sealing operation has been completed, the joined plates are gradually cooled and then sliced into thin multiple nozzle wafers. As in the case of the preferred embodiment, the presence of the cross-slots serves a plurality of purposes. After undergoing conventional lapping and polishing operations, the wafers are ready for use in heads of ink jet recorders for multiple nozzle applications.

Referring to both embodiments, more than one pair of plates may be assembled and stacked vertically (preferred embodiment) or placed at an appropriate angle and heated to provide the complete sealing of multiple rows of nozzle tubes. The entire assembly may be sealed, cut, lapped, polished and mounted to form a unit having multiple rows of nozzles.

From the foregoing, it may be seen that there is disclosed the method and apparatus for fabricating ink jet multiple nozzle arrays that are simple and efficient in operation and that provide multiple nozzle devices that contribute to the proper operation of ink jet recorders and that are superior to other approaches.

The foregoing and other objects, features and advantages of the invention will be apparent from the following more particular description of the preferred embodiments of the invention, as illustrated in the accompanying drawings.

DETAILED DESCRIPTION OF THE INVENTION

Figure 1A:
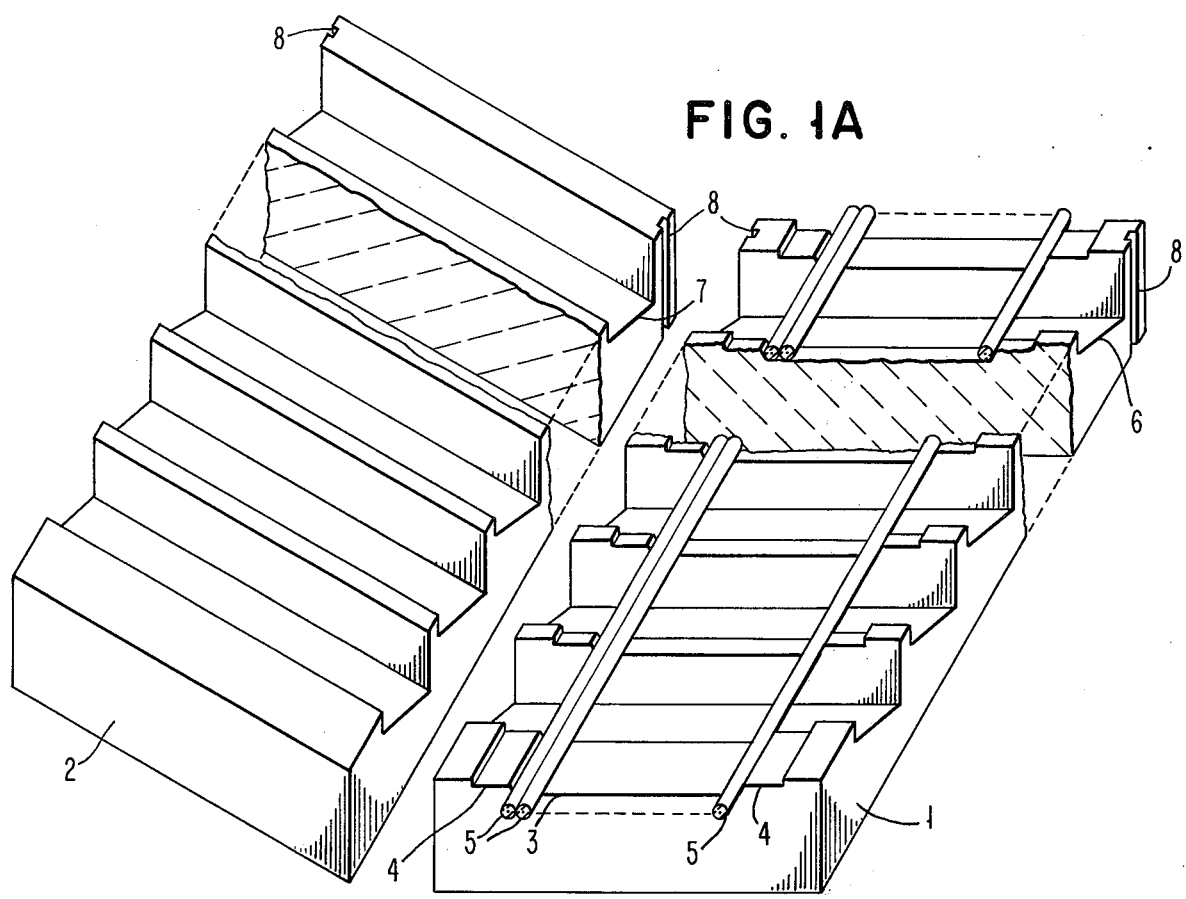
FIGS. 1A and 1B show a plate configuration in accordance with the preferred embodiment of this invention.

FIG. 1A illustrates the preferred embodiment of a plate assembly for the fabrication of multiple nozzle arrays. Plates 1 and 2, preferably of the same material (e.g., glass or ceramic) and surface area, are machined to provide parallel, deep, trapezoidal-type slots 6 and 7 along one surface thereof. Plate 1 is further machined to provide a single wide groove 3 and smaller grooves 4. Groove 3 must be wide enough to permit a plurality of orifice elements 5, preferably glass tubes, to be placed snugly side by side across the entire length of the groove surface. Groove 3 may also be slightly tapered in the corners or have undercuts in the inside corners. Smaller grooves 4 may take any dimension to assure a flow of glass between the plates to guarantee a bond between plates 1 and 2. Grooves 8 provide for alignment of the plates when assembled.

Figure 1B:
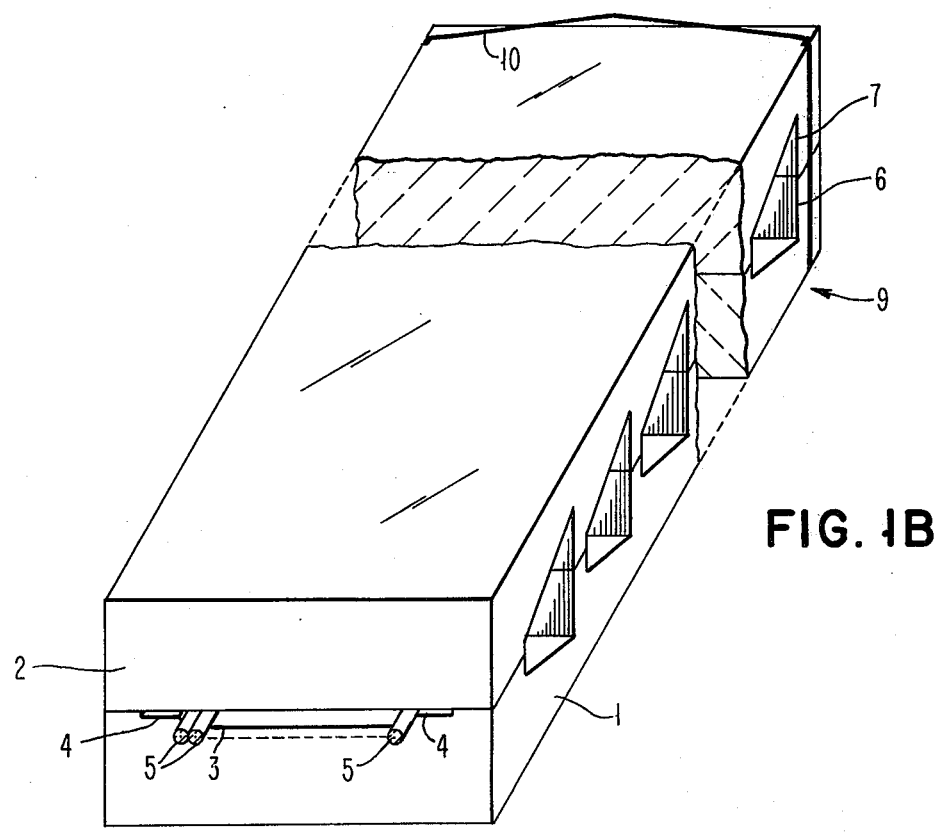

FIG. 1B shows plates 1 and 2 joined to form a plate assembly 9. It will be noted that slots 6 and 7 are perfectly aligned by wire 10 in groove 8. The wire is made of heat resistant material, e.g., tungsten. Such alignment is necessary since the area between each adjacent pair of slots will later be cut to form the multiple nozzle wafers. At this time the plates are joined, but not sealed, and the tubes 5 are shown resting loosely in groove 3.

Figure 2:
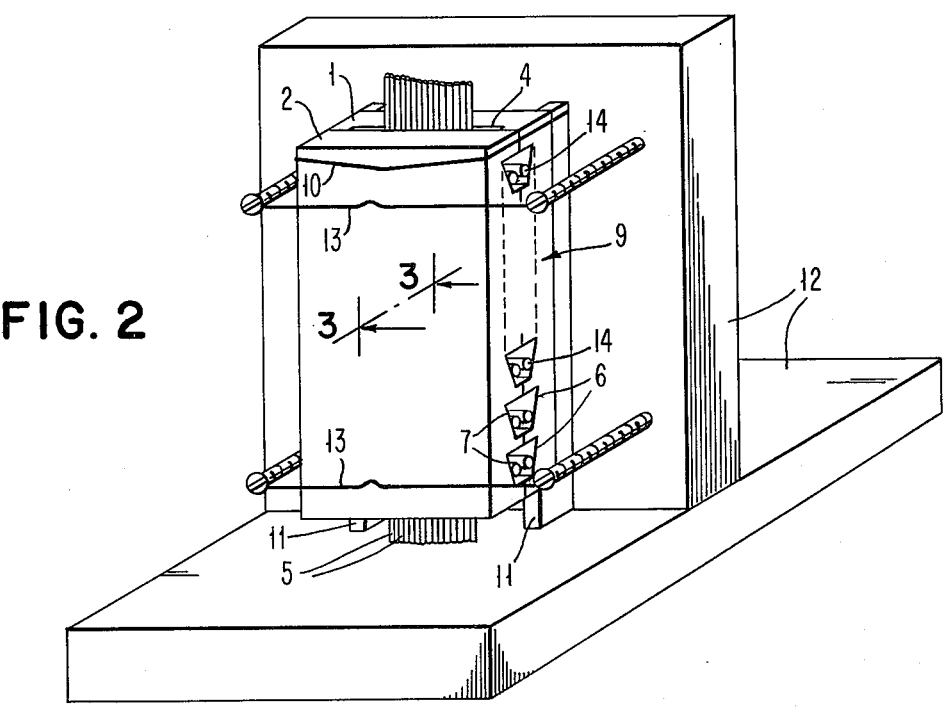
FIG. 2 shows the plate assembly mounted for the heating operation.

FIG. 2 shows a plate assembly 9 held upright on platform 11 of fixture 12 by springs 13. This arrangement permits ideal downward melt flow of glass cane 14 when the assembly and support are placed in a furnace and heated. The glass tubes are shown extended beyond the lower portion of the assembly to prevent possible orifice blockage caused by melt flow up the tubes due to capillary action. The springs 13 which are made of a heat resistant material, e.g., tungsten, provide only sufficient pressure at the center of the assembly, to keep the plates from separating and to hold the plates in the support. This is shown accomplished by the connection of the springs to elements, e.g., screws, extending from the fixture.

Figure 3:
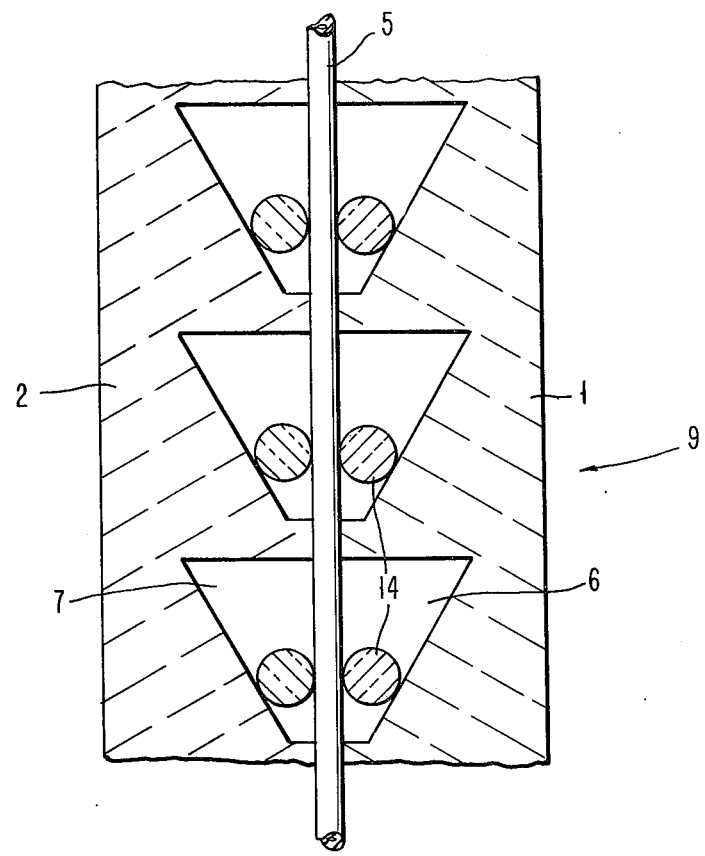
FIG. 3 shows a partial cross-sectional view of the plate assembly of FIG. 2.

FIG. 3 shows a partial cross-sectional view, taken along lines 3-3 of assembly 9 of FIG. 2. It will be seen that the trapezoidal-type slots on both sides of glass tube 5 permit the glass cane 14 to rest snugly against the glass tube on both sides and, therefore, when melted, to flow freely, due to capillary and gravity action, to cause the glass area between each upper slot and lower slot to seal in a void-and-bubble free manner.

Figure 4:
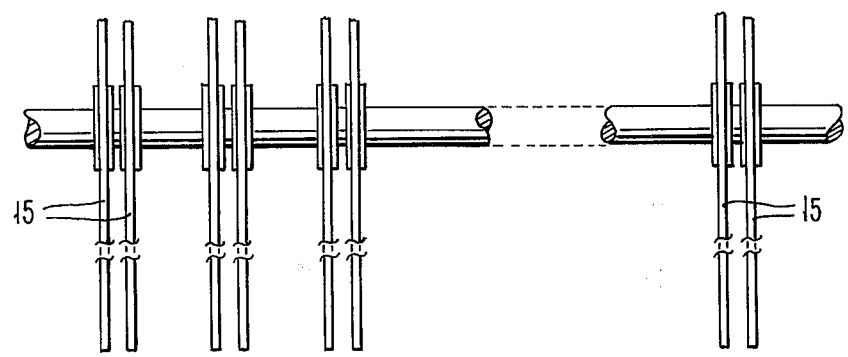
FIG. 4 shows one way of cutting the plate assembly into a plurality of wafers.
Figure 4:
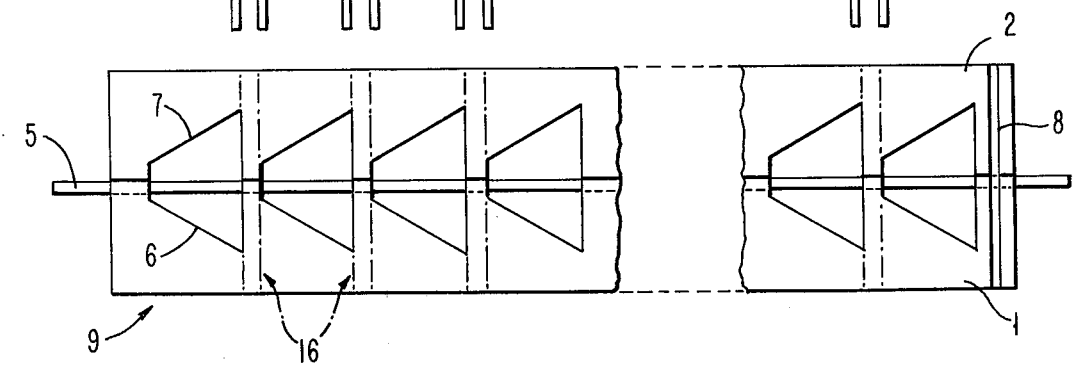

FIG. 4 illustrates one way in which plate assembly 9 may be cut after the sealing operation, wherein a plurality of uniformly spaced sawing elements 15 are moved relative to the plate assembly 9. The assembly, mounted on a fixture of a gang-sawing machine, is fed parallel with the plane of the saws while cutting takes place. While rotary saws are shown, reciprocating blade saws can also be used. It should be understood that wafers can also be cut singly in accordance with accepted techniques, although simultaneous cutting of the wafers 16 with a gangsaw arrangement is preferred, since it produces more uniform thickness throughout the length of the wafer. In the disclosed arrangement which forms a part of the invention, the cross-slots 6 and 7 reduce the area of the section cut and serve as a means for introducing an appropriate coolant as close as possible to the saw blades and the glass tubes. This assures a cutting operation without tube or seal glass damage.

Figure 5:
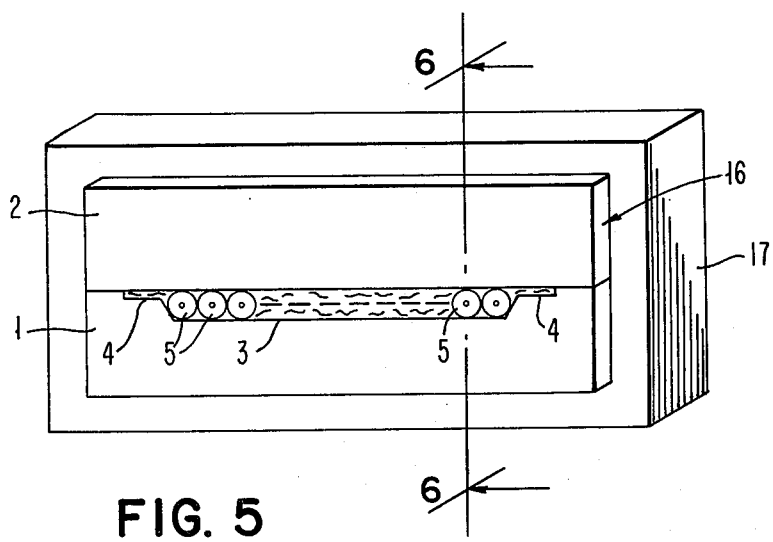
FIG. 5 shows one of the wafers on a back-up plate.

FIG. 5 shows a typical wafer 16 with the formed melt in grooves 3 and 4 which fully seals the tubes and provides a bond between the plates. After a wafer is cut, there are performed precision lapping and polishing operations that are known, e.g., see the IBM Technical Disclosure Bulletin, Dec. 1974, Vol. 17, No. 7, p. 2171. After one side of the wafer 16 has been suitably lapped and polished, it is mounted, as shown in FIG. 5, on back-up plate 17 to form the head of an ink jet recording apparatus. The back-up plate should preferably be the same material, i.e., ceramic or glass, as the wafer, although this is not mandatory. As for the mounting operation, this may be done by applying a thin coating of glass solder or epoxy at least on that portion of the back-up plate coextensive with the dimensions of the wafer and entirely around the passage-way opening. With the wafer properly aligned on the plate, it is heated, thereby causing the solder glass or epoxy to be molten and, when cooled, to bond the wafer to the back-up plate. After mounting, the front side of the wafer is lapped and polished.

Figure 6:
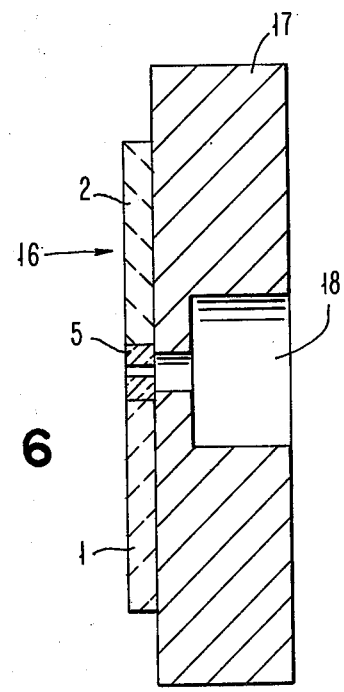
FIG. 6 shows a partial cross-sectional view of the mounted wafer of FIG. 5.

FIG. 6 illustrates a partial cross-sectional view of the mounted wafer 16, taken along lines 6—6 of FIG. 5, with proper alignment of the glass tube 5 and opening 18 of back-up plate 17. The opening in the back-up plate adjacent the wafer is larger than the glass tube opening but smaller than the annular diameter of the tube so that a fluid-tight seal is obtained to assure that when pressurized fluid is supplied to the plate, leakage will not occur around the tube.

Figure 7A:
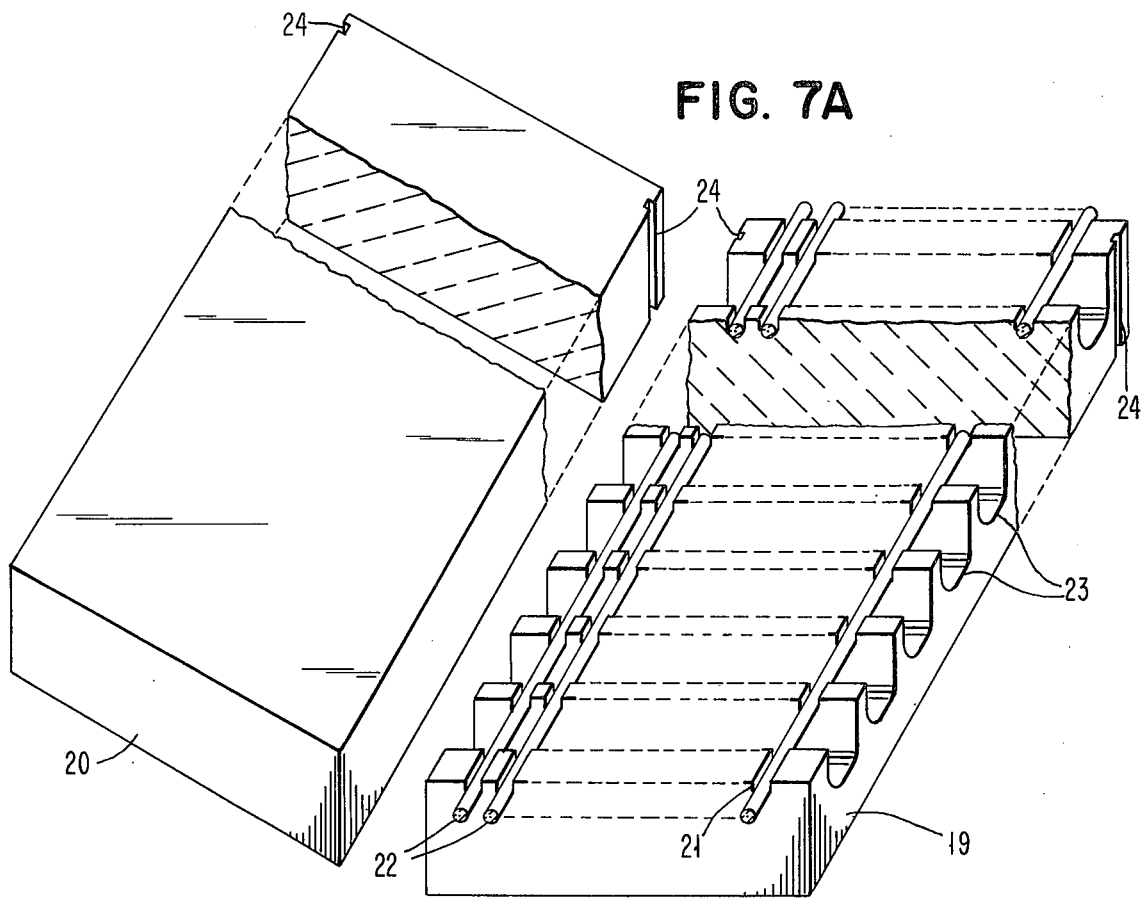
FIGS. 7A and 7B shows a plate configuration and assembly in accordance with the second embodiment of the invention.

FIG. 7A illustrates a second embodiment of a plate assembly for the fabrication of multiple nozzle arrays. Plates 19 and 20 are preferably of the same material (i.e., ceramic or glass) and surface area. Plate 19 is machined to provide a plurality of parallel grooves 21 along the length of one side and a plurality of parallel deeper slots 23 along the width of the same side and intersecting grooves 21. It is understood that any number of grooves 21 and slots 23 may be machined in the plate, as may be required by the ultimate application. Furthermore, the slots may take some other form, such as rectangular, triangular, or trapezoidal. However, what is required is that the cross-slots 23 intersect every groove 21 and be sufficiently deep to hold an appropriate amount of glass cane. Each groove 21 need only be made deep enough to hold glass tube 22 to permit accurate location and total encapsulation when the glass cane in each slot 23 is subsequently melted. Registration grooves 24 provide for alignment of the plates when assembled. Cover plate 20 has at least one smooth surface and a surface area sufficient to cover the channeled surface of plate 19.

Figure 7B:
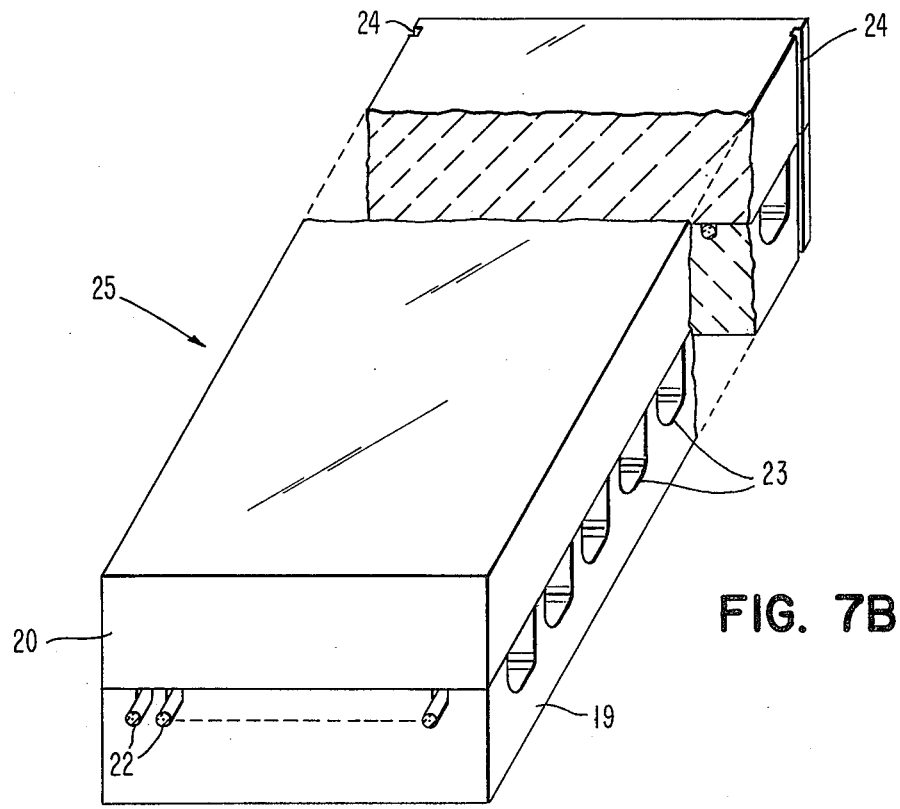

FIG. 7B shows plates 19 and 20 joined to form assembly 25. It will be seen that the glass tube 22 is in position and extending outside the assembly but the glass cane has not yet been inserted in slots 23. After the assembly is turned upside down, putting plate 20 on the bottom, the registration wire is placed in groove 24 and the glass cane is placed in slots 23, as may be seen in FIG. 8.

Figure 8:
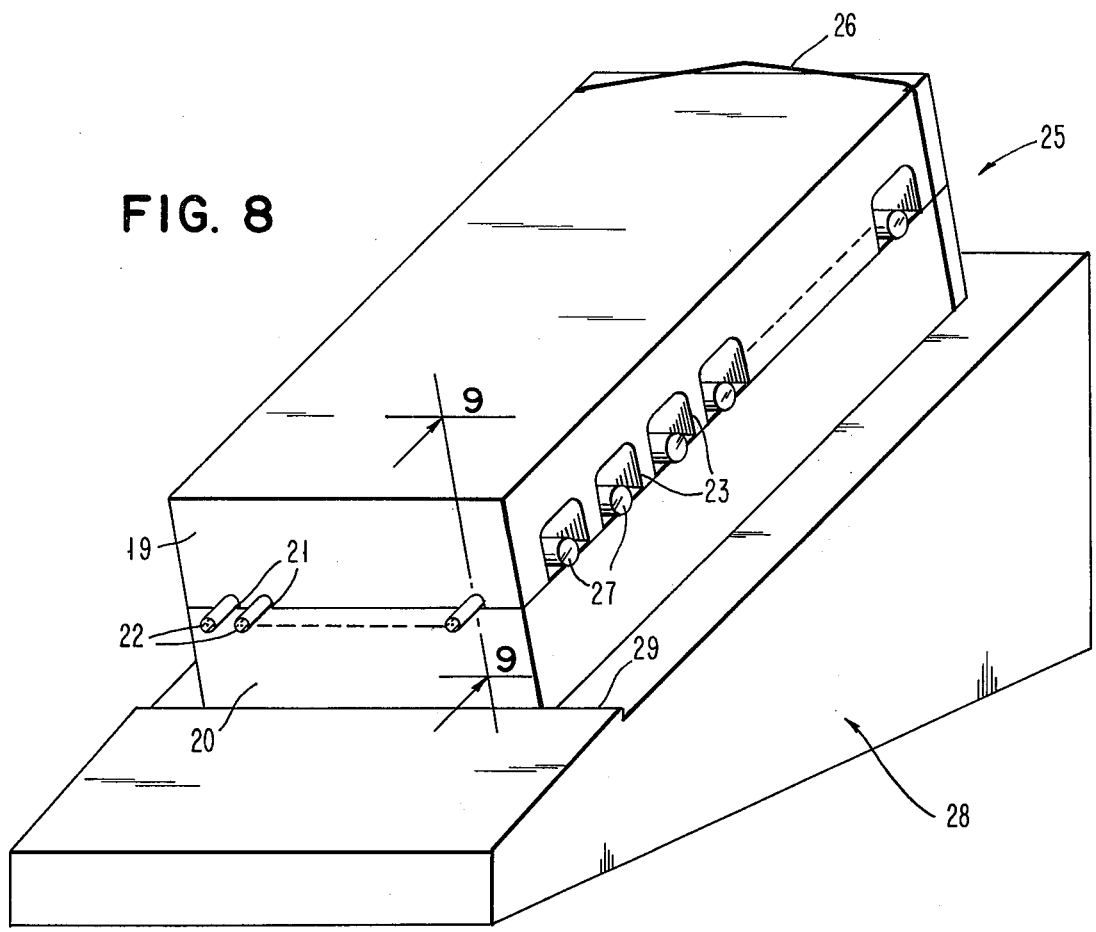
FIG. 8 shows the plate assembly mounted for the heating operation.

FIG. 8 shows plate assembly 25 with its two plates held in exact alignment by wire 26, which is made of heat resistant material, e.g., tungsten. Glass cane 27 is shown in cross-slots 23 of the assembly resting on inclined plane support 28, against edge 29, which support may take any suitable shape or angle. However, the angle at which the plate assembly 25 rests must be adequate so that the glass cane 27, whem melted, will be drawn by gravity and capillary forces, through grooves 21 to provide total encapsulation of tubes 22 in the area between adjacent pairs of slots 23. It will be noted that in the upside down position the glass cane rests directly on the glass tubes.

Figure 9:
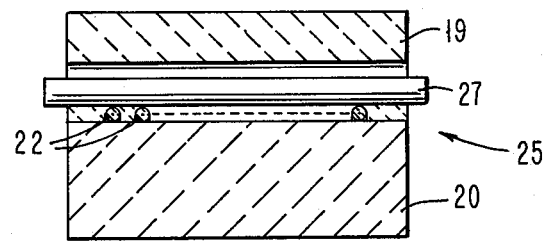
FIG. 9 shows a partial cross-sectional view of the assembly of FIG. 8.

Referring to FIG. 9, a partial cross-sectional view of plate assembly 25, taken along lines 9-9 of FIG. 8, it will be seen that the glass cane 27 in cross-slots 23 extends the width of the plate assembly and over all tubes 22. Actually, the only length requirement for the glass cane is that it adequately cover all the glass tubes. Since all tube-carrying grooves and sealant-carrying slots are interconnected at selected distances, the sealant, when melted, will flow freely in the tube-carrying grooves.

Figure 10:
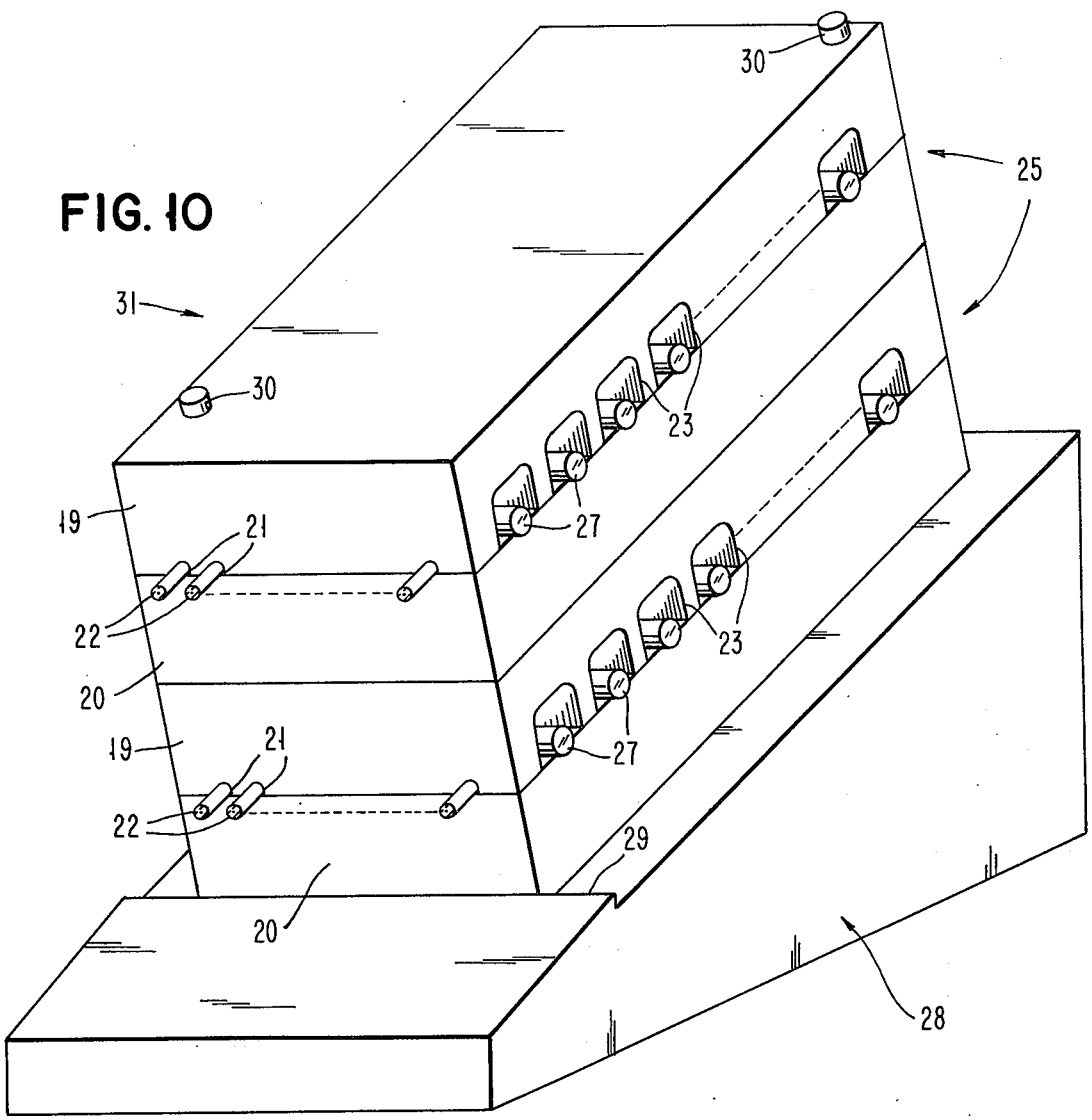
FIG. 10 shows another version of a plate assembly of FIG. 8 mounted for the heating operation.

FIG. 10 illustrates another embodiment of the inventive apparatus in which a large assembly 31 comprises two plate assemblies 25 which may be held together by ceramic dowels 30 or some other registration means. Assembly 31 is also shown on support 28 restrained by edge 29. It will be noted that in this configuration two rows of glass tubes may be sealed. However, more than two rows of tubes may be formed, the rows may be staggered or the number of tubes may vary between rows. It should also be understood that it is possible to use other combinations of plate assemblies with greater or fewer numbers of grooves and cross-slots in accordance with one's wishes or needs.

Figure 11:
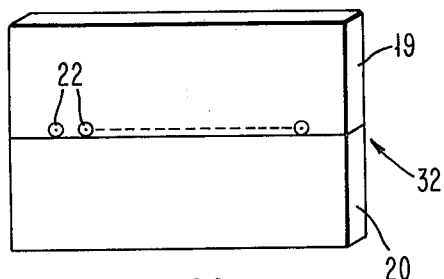
FIG. 11 shows a wafer according to the second embodiment.

After either plate assembly 25 or 31 with support 28 is placed in a furnace, the glass cane is melted and flows by capillary and gravity action through the tube-carrying grooves to provide a void-and-bubble free seal. The assembly is gradually cooled and then sliced, in the manner shown in FIG. 4, to form nozzle wafers of that portion of the assembly between adjacent ones of the cane-carrying slots. FIG. 11 shows one such wafer 32 with a row of nozzle tubes 22 sealed in their separate grooves. This wafer is lapped, polished and mounted in the manner and sequence explained above with relation to the preferred embodiment.

Figure 12A:
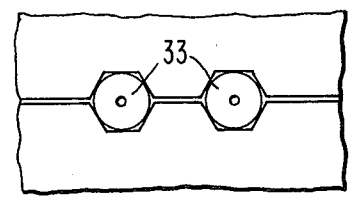
FIG. 12a and 12b show two other possible tube-groove configurations.
Figure 12B:
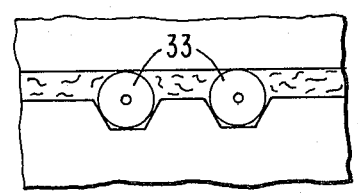

Above, there were shown and described two types of tube-groove combinations. The preferred embodiment illustrates a single groove of full depth carrying a plurality of tubes. The second embodiment presents multiple grooves of full depth with a tube in each groove. Of course, there are other possible tube-groove combinations. For example, FIG. 12A illustrates the half-depth type in which tubes 33 rest in separate trapezoidal-type grooves formed in both plates. FIG. 12B shows the minimum-depth type in which tubes 33 rest in trapezoidal-type grooves formed partly only in one plate. It should also be recognized that the tube-carrying grooves may take a form other than that shown, e.g., rectangular, triangular or circular.

The first essential in carrying out the method of this invention is to select the right match of materials for the sealant, tubes and plates. The selection of materials of improperly matched expansion coefficients would contribute to excess of stresses and/or cracking of one or more of these elements, especially in the final stage, when the temperature is lowered from the set point of the seal glass to room temperature. Also, the materials must be such that they can be simultaneously machined, lapped and polished with the same coolant, wheel or abrasive at a single feed and speed rate. Six possible materials combinations are shown below:

|  | Tubes | Sealant | Plates |
|---|---|---|---|
| 1. | Kimble R6 Glass | Owens-Illinois SG 67 Seal Glass | Forsterite 243* |
| 2. | Kimble R6 Glass | Owens-Illinois SG 67 Seal Glass | Corning 0080 |
| 3. | Kimble R 6 Glass | IBM A-130** | Forsterite UC-4* |
| 4. | Corning 7280 Glass | IBM A-106*** | Coors AD995 |
| 5. | Corning 7280 Glass | IBM A-106*** | Corning 7280 Glass |
| 6. | Corning 7280 Glass | IBM A-106*** | Steatite 665* |

*Forsterite 243, UC-4 and Steatite 665 are products of Minnesota Mining & Manufacturing Co.
**IBM A-106 comprises 40% of Owens-Illinois SG 67 and 60% of Owens-Illinois SG 7.
***IBM A-130 comprises 75% of Owens-Illinois SG 67 and 25% of Owens-Illinois SG 68.

The glass tube material is especially important because it must be compatible with the ink formulation. For example, there are some materials which cannot be used with high or low ph inks.

The next essential is to obtain precision glass tubing of appropriate length and opening. The length raises no problems. As for the opening, it has been found that the most desirable ink jet stream for recording is produced when the aspect ratio of the tube opening, i.e., the ratio of the diameter to the length of the opening is very small, for example, in the order of less than five. The diameter of a nozzle is selected in accordance with the desired application. For example, the size of the nozzle in general applications has an inner diameter of about 10–75 microns, while the outerdiameter is from 100 – 1500 microns. To obtain uniformity of print and directional stablity, the opening of the eight jet nozzles must be controlled to a tolerance as close as ±0.5 microns. This may be as close as ±0.25 microns for the uniformity of an array. The need for a uniform, shall tube opening coupled with the wafer thickness makes the fabrication process difficult and underscores the importance of the sealing operation. The final array must also be leak proof and chemically compatible with the ink.

Once the materials are selected, the three principal elements (tubes, sealant, plates) are formed in a size and configuration to meet one's multiple nozzle wafer requirements. Referring to the preferred embodiment of FIGS. 1–6, slots 7 are machined in plate 2 and a single groove 3 and cross-slots 6, which correspond to slots 7, are formed in plate 1. Glass tubes 5 are placed the length of groove 3 and snugly in the groove. The two plates 1 and 2 are then joined so that slots 6 and 7 are exactly aligned and such alignment is retained by wire 13. The plate assembly 9 is then placed in an upright position on platform 11 of fixture 12 and restrained by springs 13. Glass cane 14 is positioned in each slot 6 and 7 and will automatically come to rest on both sides of each glass tube 5.

The entire assembly, with glass cane and glass tubes in position, is now ready for heating. It is placed in a furnace and then heated to a temperature which causes the glass cane 14 alone to melt and to flow, by capillary and gravity action, through the groove 3 and small groove 4 to complete the encapsulation of tubes 5 and the sealing of the two plates 1 and 2. Heating is continued for a period of time sufficient to enable the molten glass in the cross-slots to fill the groove space not occupied by the tubes. The temperature must be minimized to preserve the holes in the tubes (preferably near the anneal temperature of the nozzle material), and must be maximized to reduce the viscosity of the seal glass to the point where good flow and complete fillng of the joint occurs.

A typical furnace cycle for materials combinations (1), (2) and (3) above is shown below:

|  | (a) | (b) | (c) |
|---|---|---|---|
| TEMP. | 535–550° C | 525° C | 340–360° C |
| TIME | .5–2 hrs | .25–.5 hr | (no hold; very slow cooling) |

Temperature level (a) is obtained gradually at about 50° C/min. Temperature level (a) is lowered even more gradually, about 1°–2° C/min., to level (b). The same approach, about 1–2° C/min., is used to proceed from level (b) to level (c), just above the anneal point temperature of the seal glass. The return to room temperature from level (c) proceeds at about 0.25–.5° C/min.

A typical furnace cycle for materials combinations (4), (5) and (6) above is shown below:

|  | (a) | (b) | (c) |
|---|---|---|---|
| TEMP. | 650–665° C | 627° C | 400–425° C |
| TIME | .5–2 hrs | .25–.5 hr | (no hold; very slow cooling) |

The same gradual temperature changes apply here, with, for example, the return to room temperature from level (c), the anneal point temperature of the seal glass, proceeding at about 0.25–0.5° C/min. In order to obtain a minimum set point, it may also be desirable to hold the assembly for a period of several hours at a chosen temperature between the seal glass strain and anneal temperatures, such as 5° C above the strain point temperature.

After the plate assembly 9 is returned to room temperature, with the two plates and all the tubes completely sealed, it is sliced as shown in FIG. 4. Each adjacent pair of saw blades are adjusted to cut through adjacent slots 6 and 7, in this way permitting the blades to be acted upon by some inserted coolant material. After the multiple nozzle wafer 16 is cut, it is mounted, in alignment, on a back-up plate 17, whch is then attached to a source of high pressure fluid.

The steps for developing multiple nozzle wafers in the second embodiment are the same once the plate assembly, having a cross-slotted plate and a flat plate, is formed and placed on an inclined plane fixture. In this case, seal glass cane is only required on one side of the tubes since it can flow in the space between the tubes to seal completely the opposite side from the cane slot.

While the invention has been particularly described in reference to preferred embodiments, thereof, it will be understood by those skilled in the art that the foregoing and other changes in form and details may be made therein without departing from the spirit and scope of the invention.

What is claimed is:

1. A method of manufacturing multiple nozzle arrays for use in ink jet recording apparatus comprising
    forming an assembly of two plates having intersecting channels therebetween which carry orifice elements and sealing material in which the sealing material has a lower melting point than said orifice elements and said plates;
    placing said assembly on a support so that said orifice elements are positioned with a downward inclination and said sealing material in each intersecting channel is in contact with a portion of each said orifice element above the area to be sealed;
    entering said assembly into a furnace having appropriate controls for temperature regulation;
    heating said assembly in a manner to cause only said sealing material to melt and to flow by capillary and gravity action to seal said orifice elements and said plates;
    cooling said assembly gradually from the set point temperature of said sealing material to room temperature;
    slicing said assembly into a plurality of multiple nozzle wafers.

2. A method according to claim 1 comprising the further steps of
    lapping and polishing each said wafer with suitable abrasive and polishing materials;
    mounting each said wafer on a back-up plate for connection to a source of high pressure fluid.

3. A method according to claim 1, in which the assembly is sliced through said sealing material carrying channels, while a coolant is introduced into said channels, and said wafer is formed from that area of the assembly between adjacent ones of said channels.

4. A method according to claim 3, in which said orifice elements are precision glass tubing, said sealing material is glass cane, and said plates are formed from any one of a number of materials, such as ceramic or glass, which have a higher melting point than the sealing material or tube material.

5. A method of manufacturing multiple nozzle arrays for use in ink jet recording apparatus comprising
    forming an assembly of two plates wherein the first plate has parallel channels on one side and the second plate has parallel channels larger than and perpendicular to a single channel on one side, the two plates being joined on the channel side with both sets of parallel channels in alignment, with the single shallow channel carrying the orifice elements and the parallel channels carrying the sealing material, and in which the sealing materal has a lower melting point than said orifice elements and said plates;
    placing said assembly on a support so that said orifice elements are positioned with a downward inclination and said sealing material contacts a portion of each said orifice element above the area to be sealed;
    entering said assembly into a furnace having appropriate controls for temperature regulation;
    heating said assembly in a manner to cause only said sealing material to melt and to flow by capillary and gravity action to seal said orifice elements and said plates;
    cooling said assembly gradually from the set point temperature of said sealing material to room temperature;
    slicing said assembly into a plurality of multiple nozzle wafers.

6. A method according to claim 5, in which the assembly is placed in an upright position so that said orifice elements are perpendicular to the base and said sealing material rests on both sides of each orifice element.

7. A method according to claim 6, in which said second plate has a small channel on each side of the orifice element carrying channel to assure a flow of glass between the plates to guarantee a bond between the plates.

8. A method according to claim 6, in which a registration means provides exact alignment of the plates and a retaining means keeps the plates from separating and secures the plates to the support.

9. A method of manufacturing multiple nozzle arrays for use in ink jet recording apparatus comprising
    forming an assembly of two plates wherein the first plate is smooth and the second plate has two sets of intersecting parallel channels of different depth, the two plates being joined on the channel side, with the smaller parallel channels carrying the orifice elements and the larger parallel channels carrying the sealing material, and in which the sealing material has a lower melting point than said orifice elements and plates;
    placing said assembly on a support so that said orifice elements are positioned with a downward inclination and said sealing material contacts a portion of each said orifice element above the area to be sealed;
    entering said assembly into a furnace having appropriate controls for temperature regulation;
    heating said assembly in a manner to cause only said sealing material to melt and to flow by capillary and gravity action to seal said orifice elements and said plates;
    cooling said assembly gradually from the set point temperature of said sealing material to room temperature;
    slicing said assembly into a plurality of multiple nozzle wafers.

10. A method according to claim 9, in which the assembly is placed on an inclined plane fixture so that the sealing material rests on one side of each orifice element.

11. A method according to claim 9, in which said assembly comprises more than one pair of plates which are heated to form wafers having a plurality of nozzle rows.

12. A method according to claim 9, in which a registration means provides exact alignment of the plates.

13. A method for fabricating multiple nozzle wafers for use in ink jet recorders comprising,
    forming an assembly of two plates with intersecting channels therebetween carrying glass tubes and glass cane having a melting point lower than the plates and the glass tubes;
    placing said assembly in a fixed position on a support so that said glass tubes are positioned with a downward inclination and said glass cane is in intersecting contact with a portion of each said glass tube above the area to be sealed;
    heating said assembly through a furnace cycle determined by the materials used in said assembly so that the glass cane alone will melt and flow by capillary and gravity action to provide a void-andbubble-free seal of that portion of the glass tubing lying between the glass cane carrying channels;

cooling said assembly gradually from the set point of the glass cane to room temperature;

slicing said assembly through the glass cane carrying channels into a plurality of multiple nozzle wafers having a thickness determined by the area between two adjacent glass cane carrying channels, while introducing an appropriate coolant during the slicing operation.

14. A method according to claim 13 comprising the additional steps of lapping and polishing each multiple nozzle wafer with suitable abrasive and polishing materials;

mounting each said wafer in alignment on a back-up plate having appropriate apertures for connection to a source of high pressure ink.

15. A method according to claim 5, in which said assembly comprises more than one pair of plates which are heated to form wafers having a plurality of nozzle rows.

* * * * *